(12) United States Patent
Kishida et al.

(10) Patent No.: US 9,944,203 B2
(45) Date of Patent: Apr. 17, 2018

(54) MOTOR-EQUIPPED GEAR BOX MOUNTING STRUCTURE

(71) Applicants: TOYOTA BOSHOKU KABUSHIKI KAISHA, Aichi-ken (JP); AISIN SEIKI KABUSHIKI KAISHA, Aichi-ken (JP); SHIROKI CORPORATION, Kanagawa (JP)

(72) Inventors: Hideyoshi Kishida, Owariasahi (JP); Eiichiro Tsuji, Kariya (JP)

(73) Assignees: TOYOTA BOSHOKU KABUSHIKI KAISHA, Aichi-Ken (JP); AISIN SEIKI KABUSHIKI KAISHA, Aichi-Ken (JP); SHIROKI CORPORATION, Kanagawa (JP)

( * ) Notice: Subject to any disclaimer, the term of this patent is extended or adjusted under 35 U.S.C. 154(b) by 134 days.

(21) Appl. No.: 14/811,367

(22) Filed: Jul. 28, 2015

(65) Prior Publication Data
US 2016/0059752 A1 Mar. 3, 2016

(30) Foreign Application Priority Data

Aug. 28, 2014 (JP) .................................. 2014-174369

(51) Int. Cl.
*B60N 2/16* (2006.01)
*F16H 57/039* (2012.01)
(Continued)

(52) U.S. Cl.
CPC ........... *B60N 2/165* (2013.01); *B60N 2/0232* (2013.01); *B60N 2/1615* (2013.01);
(Continued)

(58) Field of Classification Search
None
See application file for complete search history.

(56) References Cited

U.S. PATENT DOCUMENTS 4,195,881 A * 4/1980 Kluting ................ B60N 2/2213
188/69
4,958,544 A * 9/1990 Miyamoto ........... B23D 45/025
83/471.3
(Continued)

FOREIGN PATENT DOCUMENTS

JP 62-92737 U 6/1987
JP 7-22831 U 4/1995
(Continued)

OTHER PUBLICATIONS

Japanese Office Action for counterpart JP App. No. 2014-174369 dated Nov. 7, 2017, along with partial English-language translation thereof.

*Primary Examiner* — David E Allred
(74) *Attorney, Agent, or Firm* — Greenblum & Bernstein, P.L.C.

(57) ABSTRACT

A motor-equipped gear box mounting structure includes a motor-equipped gear box. This motor-equipped gear box includes a motor and a gear box. The gear box has a main body portion that is fixed to the frame member and within which is housed a reduction gear group that transmits driving force from the motor to an output shaft, and a motor mounting portion that mounts the motor to the main body portion. The gear box also has a weak portion between the main body portion and the motor mounting portion. A rotating shaft of the motor is coaxially and detachably connected to a rotating shaft of a worm gear that is one gear in the reduction gear group.

10 Claims, 9 Drawing Sheets

(51) Int. Cl.
*B60N 2/02* (2006.01)
*B60N 2/427* (2006.01)

(52) U.S. Cl.
CPC ....... *B60N 2/42709* (2013.01); *F16H 57/039* (2013.01); *B60N 2002/024* (2013.01); *B60N 2002/0236* (2013.01)

(56) References Cited

U.S. PATENT DOCUMENTS

| | | | | |
|---|---|---|---|---|
| 5,090,261 A | * | 2/1992 | Nakatsukasa | B60S 1/08 384/610 |
| 5,407,088 A | * | 4/1995 | Jorgensen | H02G 3/20 220/3.9 |
| 5,838,219 A | * | 11/1998 | Du | H01H 3/264 200/50.32 |
| 6,539,649 B2 | * | 4/2003 | Sueshige | E01H 5/04 192/17 R |
| 6,975,059 B2 | * | 12/2005 | Sakai | H01R 39/383 310/239 |
| 7,055,351 B2 | * | 6/2006 | Suzuki | B60R 25/02153 70/186 |
| 2010/0060061 A1 | * | 3/2010 | Koga | B60N 2/0232 297/344.1 |

FOREIGN PATENT DOCUMENTS

| | | |
|---|---|---|
| JP | 2009-192044 A | 8/2009 |
| JP | 2010-064619 A | 3/2010 |
| JP | 2011-525163 | 9/2011 |
| WO | 2009/155544 | 12/2009 |

* cited by examiner

MOTOR-EQUIPPED GEAR BOX MOUNTING STRUCTURE

INCORPORATION BY REFERENCE

The disclosure of Japanese Patent Application No. 2014-174369 filed on Aug. 28, 2014 including the specification, drawings and abstract is incorporated herein by reference in its entirety.

BACKGROUND OF THE INVENTION

1. Field of the Invention

The invention relates to motor-equipped gear box mounting structure for a vehicle power seat mounted in a vehicle such as an automobile, an aircraft, a vessel, or a train or the like.

2. Description of Related Art

One known vehicle power seat is provided with a motor-equipped gear box that reduces the driving force from the motor and transmits this reduced driving force to a sector gear via a pinion gear, such that a height of a seat cushion is able to be adjusted. In technology described in Published Japanese Translation of PCT application No. 2011-525163 (JP-A-2011-525163), a motor-equipped gear box is mounted to a frame member that is attached onto a slide rail by three sets of nuts and bolts.

SUMMARY OF THE INVENTION

In the technology described in JP-A-2011-525163, if an excessive load is applied to the frame member as a result of a collision of the vehicle or the like, and the frame member bends, the motor-equipped gear box may break and the gears housed inside may be scattered. To avoid this from happening, either the frame member is made strong enough so as not to bend at the time of a collision, or a design is implemented in which a weakening portion is provided at a portion other than near the position where the motor-equipped gear box is mounted to the frame member, and this weakening portion deforms at the time of a collision such that the bending of the frame member does not affect the motor-equipped gear box. With the former, the frame member will become heavier due to being larger or thicker or the like, and with the latter, the degree of freedom in design ends up being lost, so both are problematic.

The invention thus provides a motor-equipped gear box mounting structure that inhibits gears housed in the motor-equipped gear box from being scattered, even if an excessive load is applied to a frame member due to a collision of a vehicle or the like, such that the frame member bends and pushes on the motor-equipped gear box.

An aspect of the invention relates to a motor-equipped gear box mounting structure in which a motor-equipped gear box for vertically adjusting is attached a seating surface to a frame member that extends in a front-rear direction of a vehicle power seat. This motor-equipped gear box mounting structure includes a motor-equipped gear box. The motor-equipped gear box includes a motor and a gear box. The gear box has a main body portion that is fixed to the frame member and within which is housed a reduction gear group that transmits driving force from the motor to an output shaft, and a motor mounting portion that mounts the motor to the main body portion. The gear box also has a weak portion between the main body portion and the motor mounting portion. This weak portion breaks, such that the motor and the motor mounting portion are able to detach from the main body portion, when a pressing force is applied to the motor-equipped gear box as a result of deformation of the frame member. A rotating shaft of the motor is coaxially and detachably connected to a rotating shaft of a worm gear that is one gear in the reduction gear group.

According to this aspect, the motor mounting portion and the main body portion of the gear box are attached via the weak portion, so this weak portion breaks when an excessive load is applied to the frame member due to a collision of the vehicle or the like, and the frame member deforms and applies a pushing force on the motor of the motor-equipped gear box. At this time, the motor and the motor mounting portion are able to detach from the main body portion. Also, the rotating shaft of the motor is coaxially and detachably connected to the rotating shaft of the worm gear, so the motor and the motor mounting portion detach from the main body portion. At this time, the worm gear remains in the gear box in a state meshed with the another reduction gear, so the rotation of the overall reduction gear is maintained in a stopped state so the gears are able to be inhibited from being scattered.

In the aspect described above, the main body portion, the motor mounting portion, and the weak portion may be an integrated resin part, and the weak portion may be formed in a narrow shape compared to the main body portion and the motor mounting portion.

According to this structure, the weak portion is formed by making a portion of the gear box that is an integrated resin part have a narrow shape, so the operation and effects of the aspect described above are able to be achieved with a simple structure.

In the aspect described above, the rotating shaft of the motor may be connected to the rotating shaft of the worm gear by a rubber shaft coupling that detachably connects the rotating shaft of the motor to the rotating shaft of the worm gear via a rubber spacer.

According to this structure, the rotating shaft of the motor is connected to the rotating shaft of the worm gear by a rubber shaft coupling that detachably connects the rotating shaft of the motor to the rotating shaft of the worm gear via a rubber spacer, so the operation and effects of the aspect described above are able to be achieved with a simple structure. Moreover, vibration when the motor rotates is able to be absorbed via the rubber spacer, so operational noise of the motor-equipped gear box is able to be reduced.

In the aspect described above, a reinforcing plate that reinforces the main body portion and supports a rotating shaft of another gear in the reduction gear group that transmits driving force from the worm gear to the output shaft, may be attached to a surface of the main body portion that is on a side where the main body portion attaches to the frame member, and at least one fixing position where the reinforcing plate is fixed to the main body portion may be provided near the weak portion.

According to this structure, the reinforcing plate that reinforces the main body portion and supports a rotating shaft of another gear in the reduction gear group that transmits driving force from the worm gear to the output shaft, is attached to a surface of the main body portion that is on a side where the main body portion attaches to the frame member. As a result, the main body portion is able be made less susceptible to breaking, while keeping the reduction gear group in a meshed state. Also, at least one fixing position on the reinforcing plate is provided near the weak portion. As a result, when a pressing force is applied to the motor from the frame member, stress is able to more efficiently concentrate at the weak portion, so the weak portion 63c is able to break easily and the motor can separate from the main body portion. Therefore, the rotation of the overall reduction gear is maintained in a stopped state so the gears are able to be inhibited from being scattered.

In the aspect described above, a thrust force applied to the rotating shaft of the worm gear may act in a direction opposite the motor, when a rotational force applied to the output shaft when a collision of the vehicle occurs is transmitted to the worm gear.

According to this structure, the thrust force applied to the rotating shaft of the worm gear may act in the direction opposite the motor, when a rotational force applied to the output shaft when a collision of the vehicle occurs is transmitted to the worm gear. As a result, even if by some chance the worm gear does rotate, the thrust force applied to the rotating shaft of the worm gear will not act in the direction of the detached motor, so the rotation of the overall reduction gear is able to be more efficiently maintained in a stopped state, so that the gears are able to be inhibited from being scattered.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
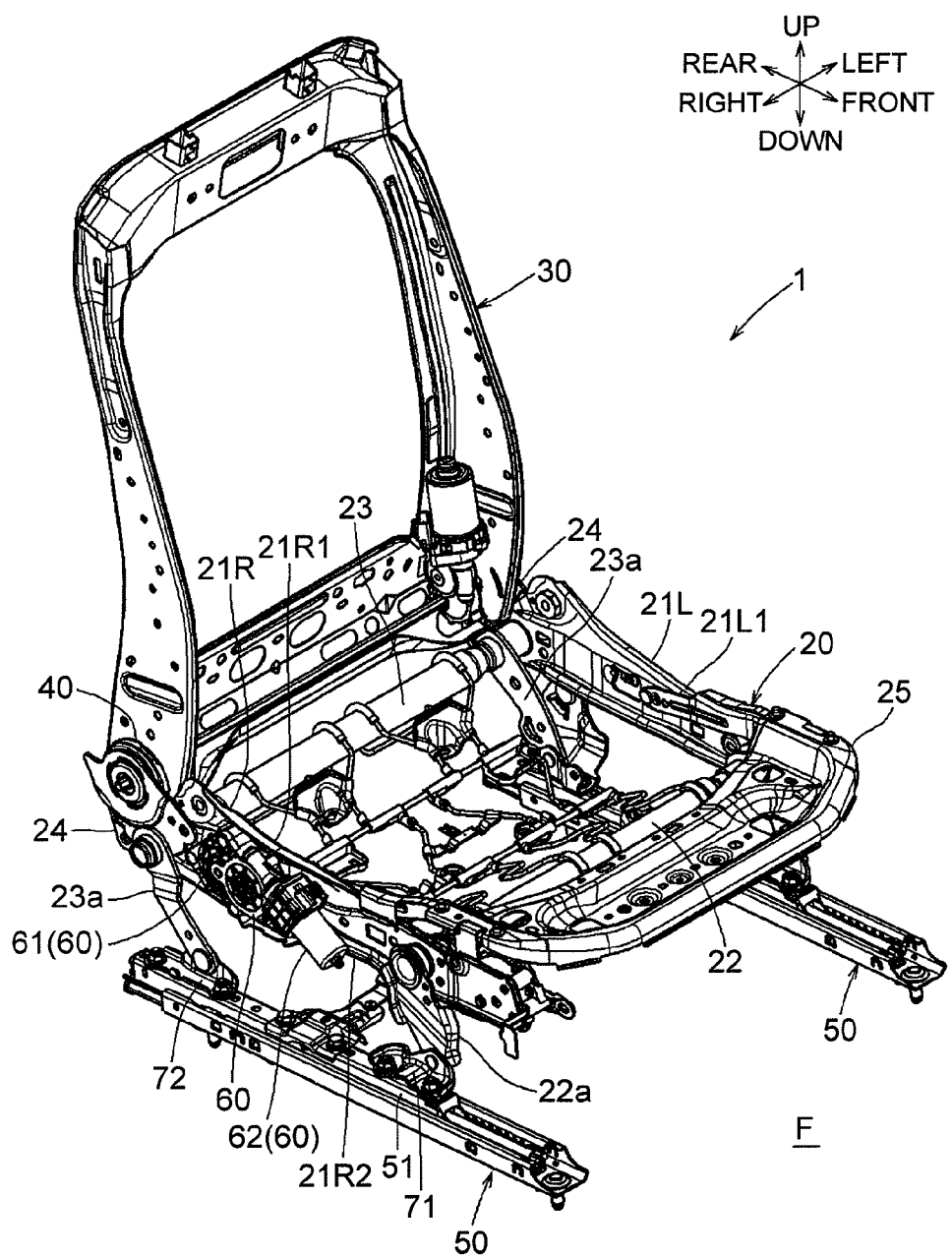
FIG. 1 is a perspective view, as viewed from the front, of a seat frame that employs one example embodiment of the invention.

FIGS. 1 to 9 are views of one example embodiment of the invention. This example embodiment illustrates an example in which the invention is applied to a seat frame for an automobile (hereinafter, also referred to as "vehicle"). In the drawings, the directions of the vehicle when the vehicle seat frame is mounted are indicated by arrows. In the description below, descriptions related to a direction are based on these directions. A vehicle seat frame 1 of the example embodiment includes a cushion frame 20 and a back frame 30. A headrest is mounted to an upper portion of the back frame 30, but is omitted in the drawings.

The cushion frame 20 has a right-side side frame 21R and a left-side side frame 21L that extend in a front-rear direction on the right and left side portions, respectively. The right-side side frame 21R and the left-side side frame 21L are generally rectangular plate-shaped pressed parts, in which a length direction thereof extends in the front-rear direction. Upper flange portions 21R1 and 21L1 that extend in a seat outside direction are provided on upper end portions of the right-side side frame 21R and the left-side side frame 21L, respectively, and lower flange portions 21R2 and 21L2 that extend in the seat outside direction are provided on lower end portions of the right-side side frame 21R and the left-side side frame 21L, respectively. A cylindrically-shaped front pipe 22 is rotatably attached to the right-side side frame 21R and the left-side side frame 21L on a front side thereof, and a cylindrically-shaped rear pipe 23 is rotatably attached to the right-side side frame 21R and the left-side side frame 21L on a rear side thereof. A front panel 25 is attached so as to be able to rotate in the vertical direction to the front side portions of the right-side side frame 21R and the left-side side frame 21L, and a pair of lower arms 24 are attached to the rear side portions of the right-side side frame 21R and the left-side side frame 21L. The back frame 30 is attached to the lower arms 24 via a recliner 40, and an angle of the back frame 30 with respect to the cushion frame 20 is able to be adjusted by operating this recliner 40. Here, the right-side side frame 21R is one example of a "frame member" within the scope of the claims.

A lifter mechanism to enable vertical movement is provided on the cushion frame 20. Two front links 22a that are fixed to the front pipe 22 are rotatably attached via brackets 71 to upper rails 51 of slide rails 50 that are fixed to a floor F. Two rear links 23a fixed to the rear pipe 23 are pivotally attached via brackets 72 to the upper rails 51 of the slide rails 50 that are fixed to the floor F. The slide rails 50 enable the cushion frame 20 to slide in the front-rear direction with respect to the floor F. In the description below, parts and the like that are provided in plurality may be referred to in the singular to simplify the description and facilitate understanding.

Figure 2:
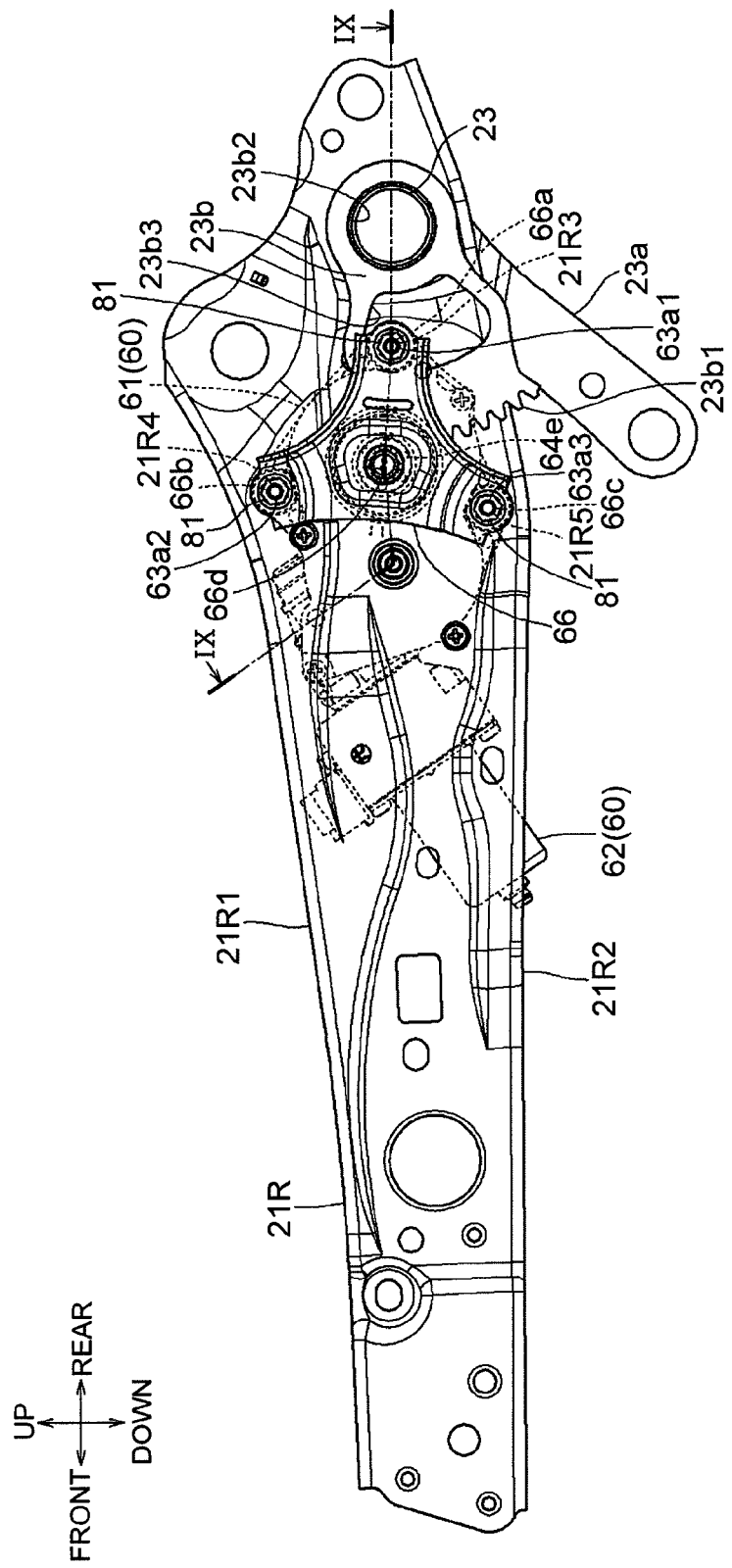
FIG. 2 is a side view, as viewed from a seat inside, of a state in which a motor-equipped gear box is mounted to a right-side side frame of a cushion frame of the example embodiment.
Figure 3:
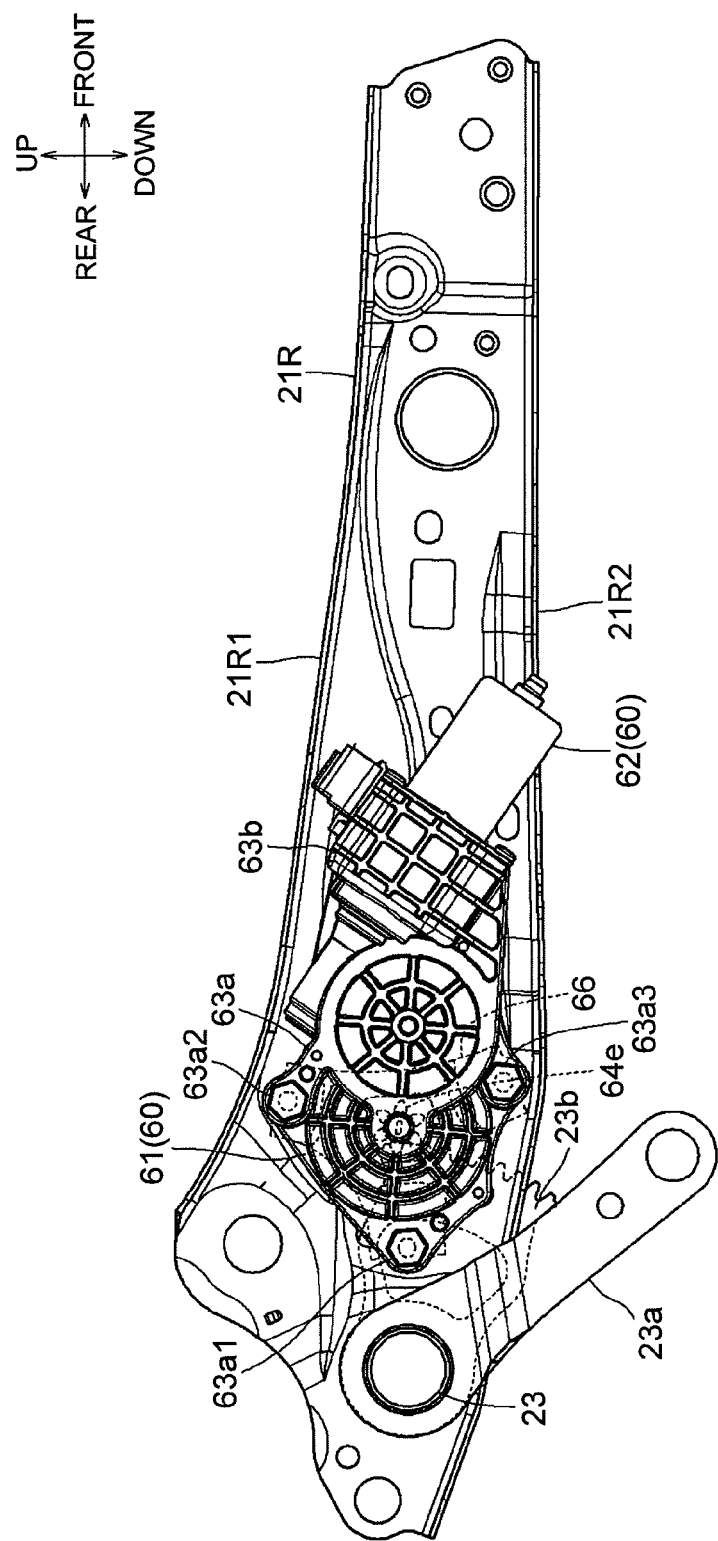
FIG. 3 is a side view, as viewed from a seat outside, of the state in which the motor-equipped gear box is mounted to the right-side side frame of the cushion frame of the example embodiment.

A sector gear 23b is fixed to the rear pipe 23, as shown in FIGS. 2 and 3. The sector gear 23b is a generally sectorial (i.e., fan-shaped) steel metal member, with teeth 23b1 provided on an arcuate portion and a fixing hole 23b2 through which the rear pipe 23 passes and to which the rear pipe 23 is fixed, opened in a main portion of the sector. Also, a generally trapezoidal-shaped hole 23b3 is provided between the teeth 23b1 and the fixing hole 23b2. The teeth 23b1 of the sector gear 23b are arranged in mesh with a pinion gear 64e provided in a motor-equipped gear box 60 mounted to the right-side side frame 21R. The specific mounting structure by which the sector gear 23b and the motor-equipped gear box 60 are mounted to the right-side side frame 21R will be described later. The pinion gear 64e rotates by the driving of a motor 62. The rear pipe 23 rotates via the sector gear 23b by the rotation of the pinion gear 64e, and the rear link 23a pivots in the vertical direction with respect to the bracket 72 that is attached to the upper rail 51. At this time, the front link 22a that is a portion of a four-section link formed by the right-side side frame 21R or the left-side side frame 21L, the front link 22a, the upper rail 51, and the rear link 23a is driven by the movement of the rear link 23a and pivots in the vertical direction. As a result, the cushion frame 20 moves up and down with respect to the floor F.

Figure 9:
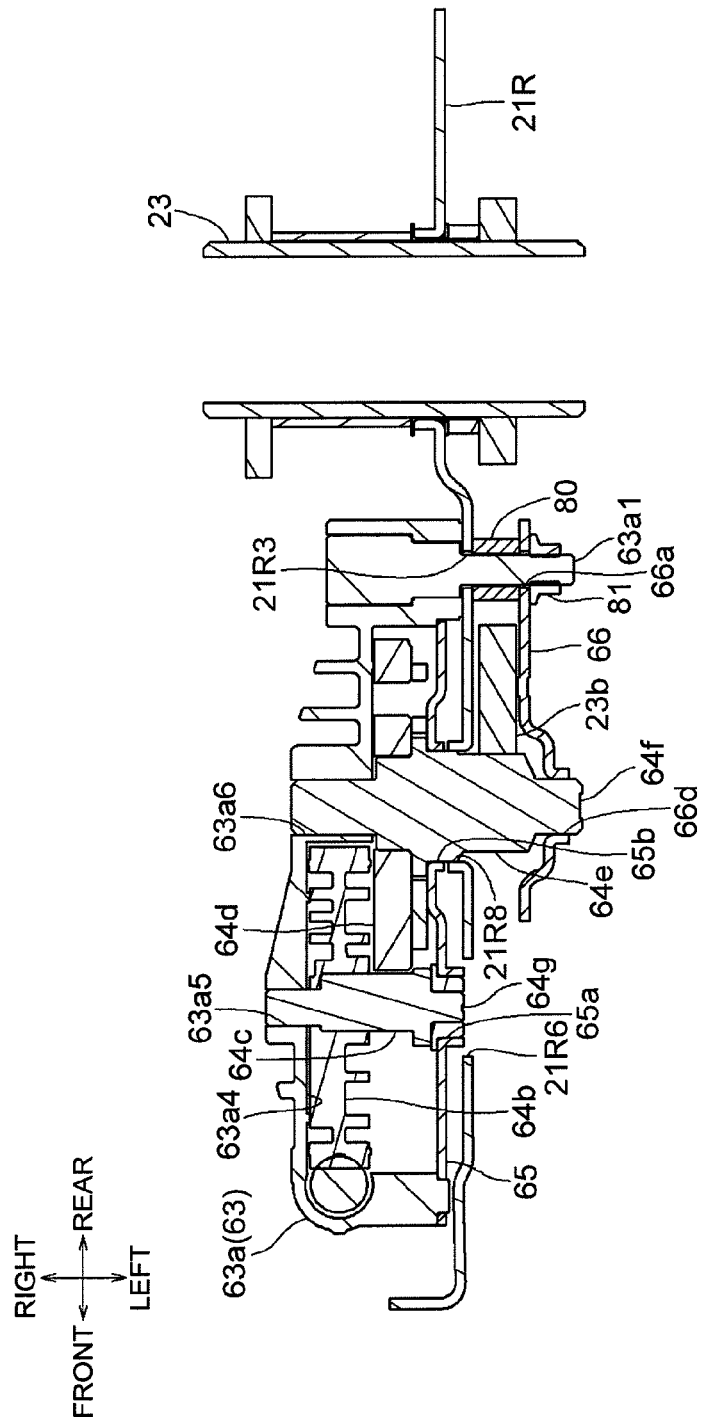
FIG. 9 is a sectional view taken along line IX-IX in FIG. 2.

As shown in FIGS. 2 and 3, the motor-equipped gear box 60 that includes the motor 62 and a gear box 61 is mounted to a surface (i.e., a surface on the seat outside) on the right side toward the rear of the right-side side frame 21R. The gear box 61 includes a polybutylene resin gear box case 63, a reduction gear group 64, and a cover plate 65, as shown in FIGS. 4 to 7. The gear box case 63 includes, as a unit, a case main body portion 63a that houses the reduction gear group 64 that transmits driving force from the motor 62 to the pinion gear 64e and is fixed to the right-side side frame 21R, a motor mounting portion 63b for mounting the motor 62 to the case main body portion 63a, and a weak portion 63c that connects the case main body portion 63a to the motor mounting portion 63b. As shown in FIGS. 7 and 9, a recessed portion 63a4 for housing the reduction gear group 64 is provided on the case main body portion 63a. A first support hole 63a5 that supports a rotating shaft 64g of a first reduction gear 64b and a second reduction gear 64c, and a second support hole 63a6 that supports a rotating shaft 64f of a third reduction gear 64d and the pinion gear 64e, are provided in the recessed portion 63a4. Also, three mounting bolts are arranged with shaft portions thereof facing the left side (facing the seat inside direction), fixed in an non-rotatable manner to the case main body portion 63a, near an outer peripheral portion of the case main body portion 63a, in order to mount the case main body portion 63a to the right-side side frame 21R. The three mounting bolts are a rear mounting bolt 63a1, a front upper mounting bolt 63a2, and a front lower mounting bolt 63a3, which are arranged in positions at apexes of a generally equilateral triangular shape in a side view. More specifically, a line that connects the front upper mounting bolt 63a2 and the front lower mounting bolt 63a3 together extends in substantially the vertical direction as a bottom side, and the rear mounting bolt 63a1 is substantially arranged in the apex position of the equilateral triangular shape that is to the rear of this line. The three mounting bolts are all hexagon bolts, with a head portion of a regular hexagonal prism embedded in the case main body portion 63a, and a shaft portion protruding from a surface on the seat inside. Here, the case main body portion 63a is one example of a "main body portion" within the scope of the claims.

Figure 4:
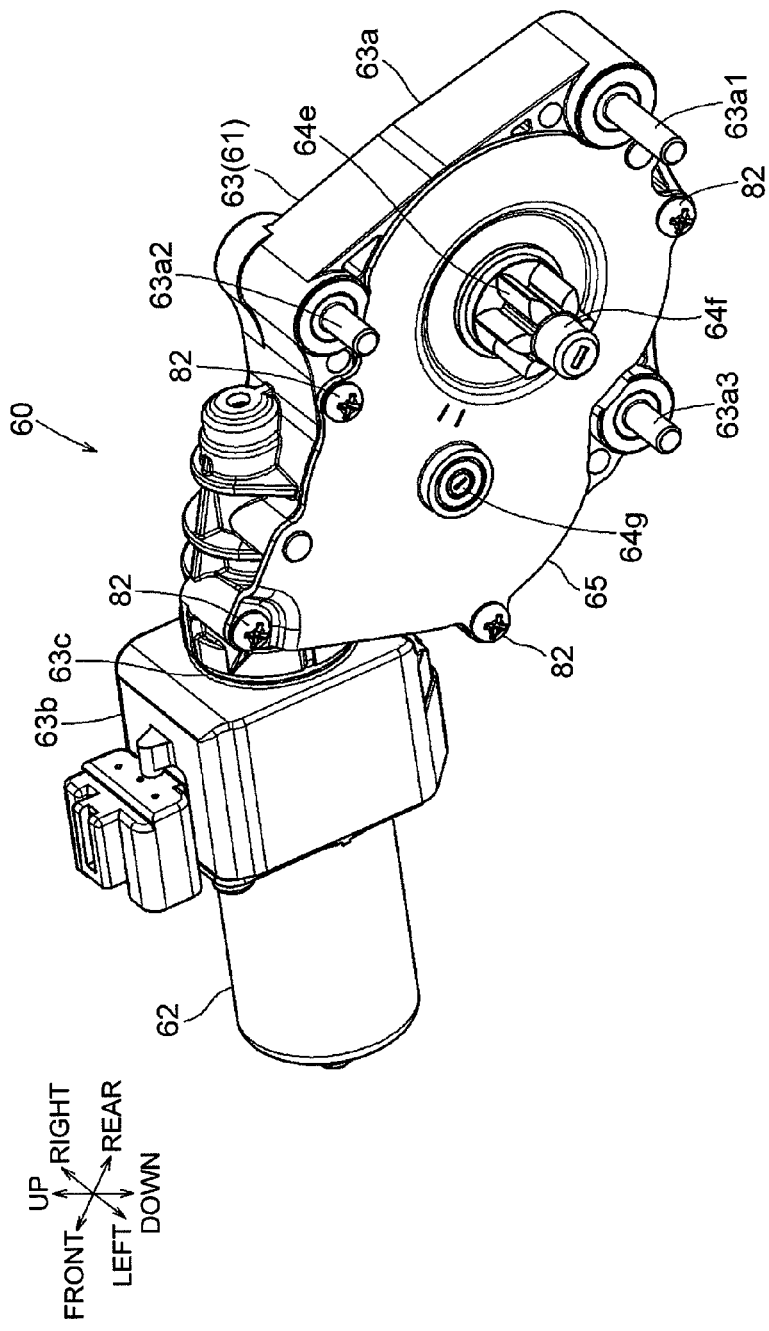
FIG. 4 is a perspective view of the motor-equipped gear box of the example embodiment.
Figure 5:
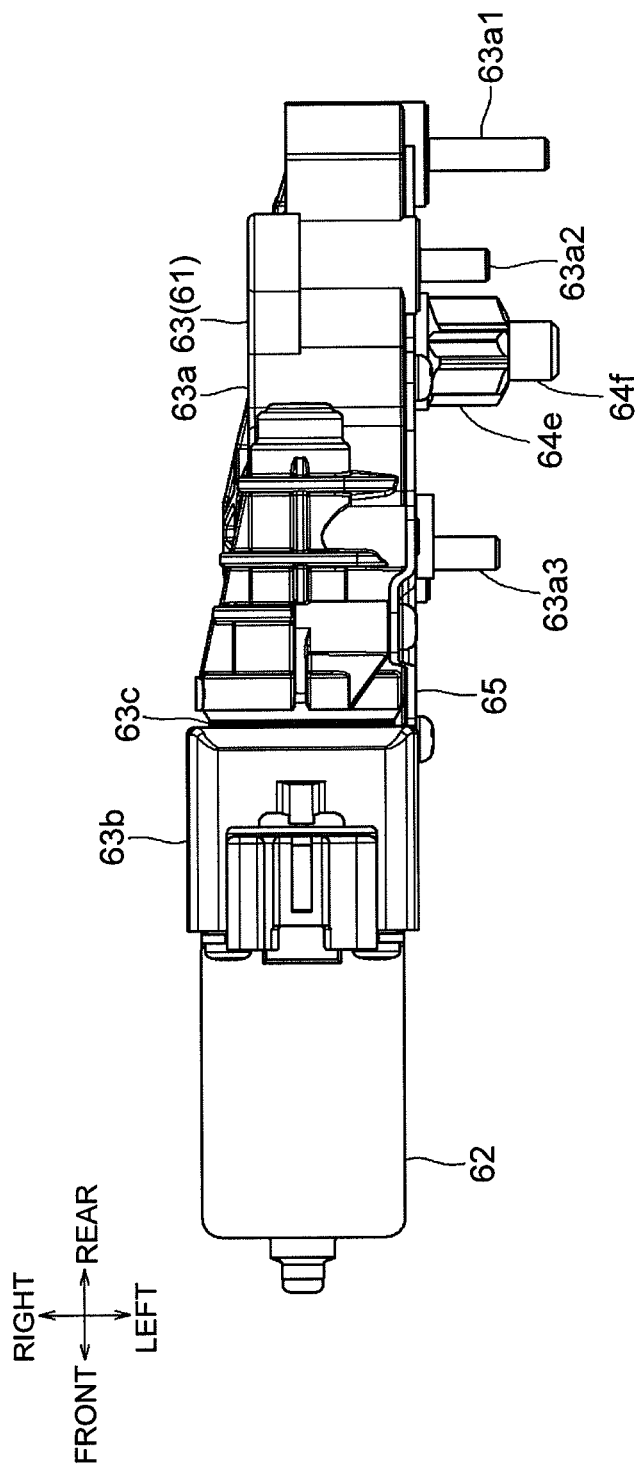
FIG. 5 is a plan view of the motor-equipped gear box of the example embodiment.
Figure 6:
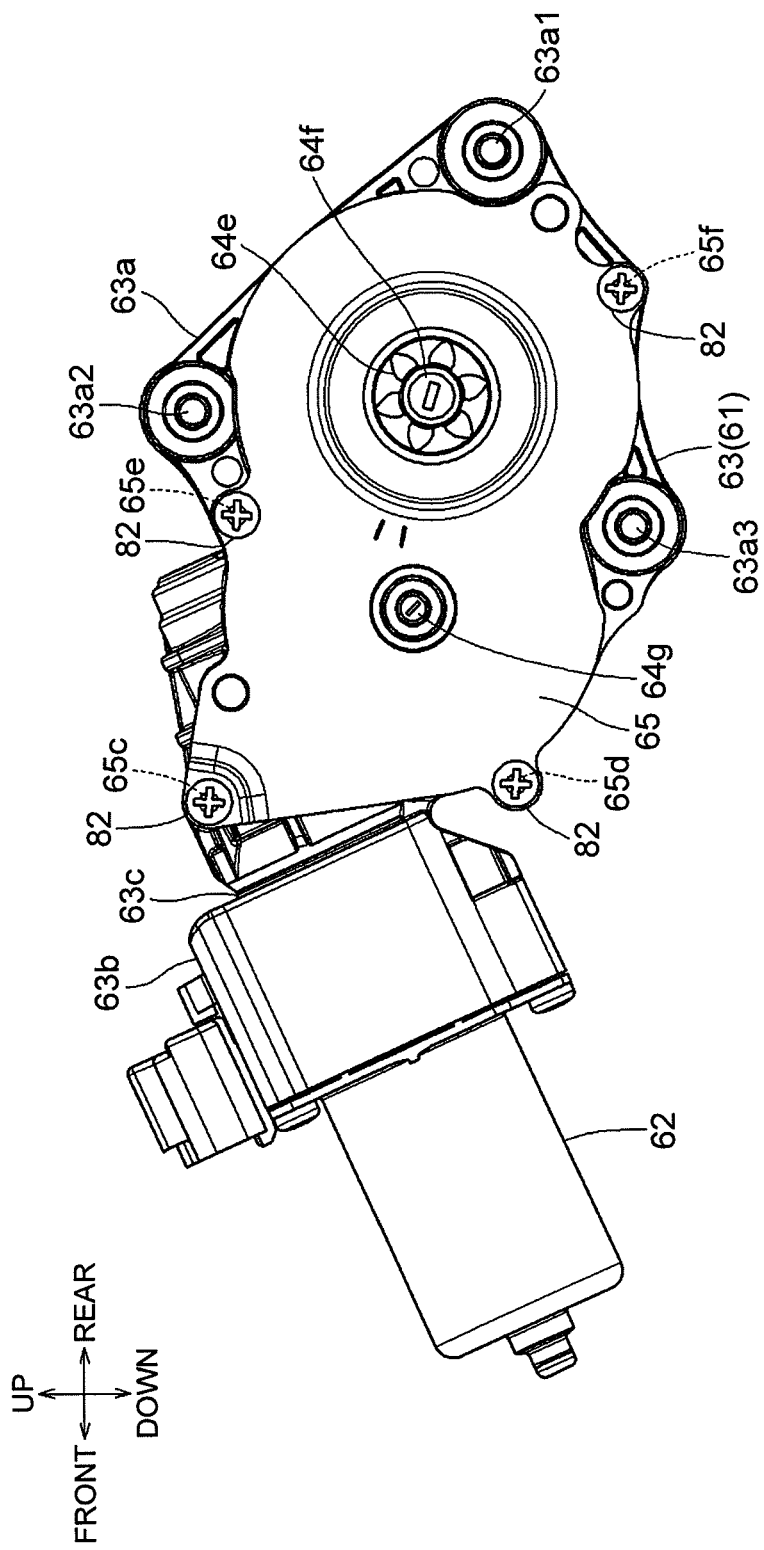
FIG. 6 is a side view of the motor-equipped gear box of the example embodiment.
Figure 7:
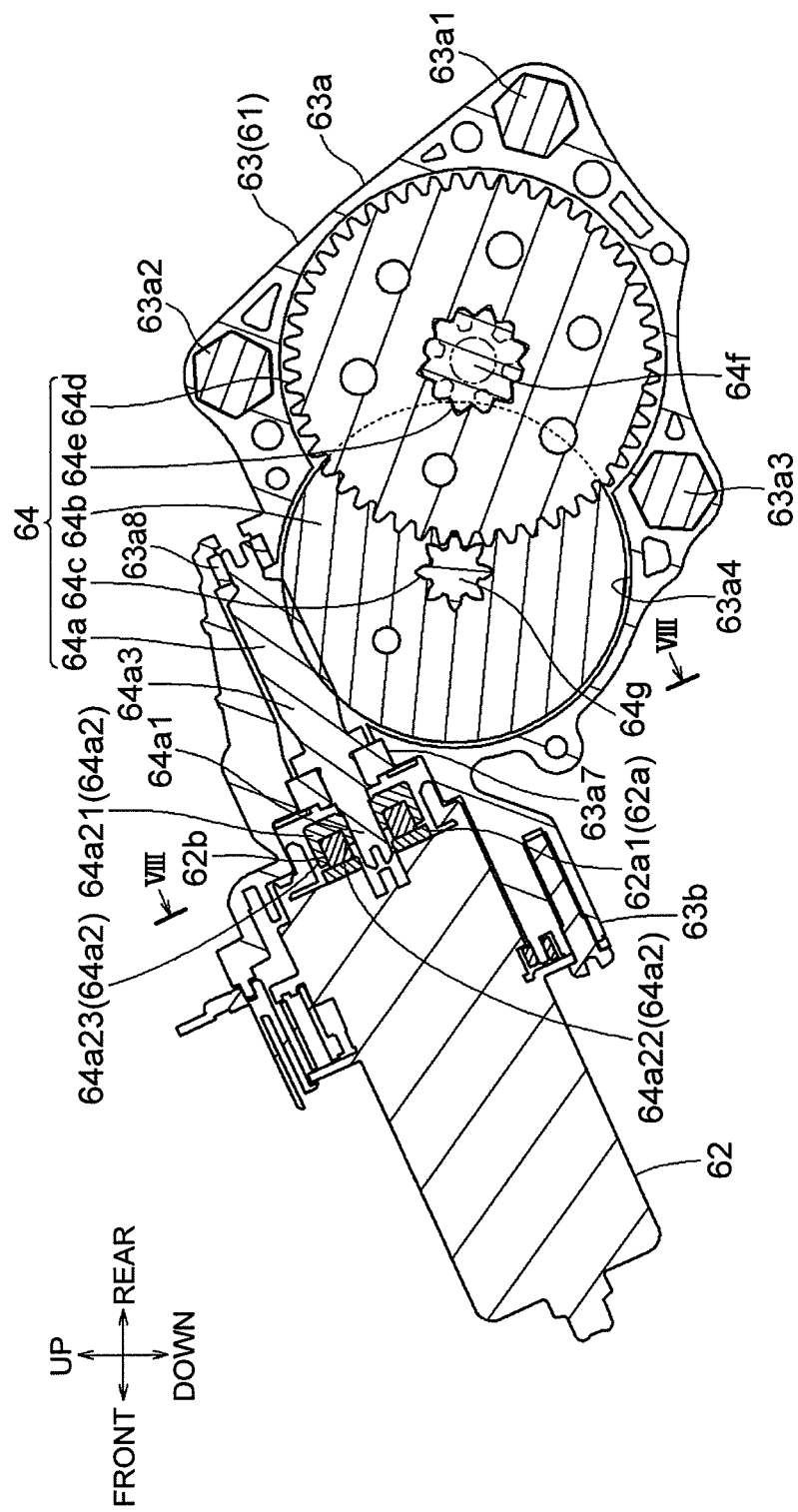
FIG. 7 is a view of a meshing state of a reduction gear housed inside the motor-equipped gear box of the example embodiment.

As shown in FIGS. 4 to 6, the motor mounting portion 63b is integrally provided via the weak portion 63c in front of the case main body portion 63a. The motor mounting portion 63b is a portion that supports a rotating shaft 62a side body of the motor 62 by sandwiching this rotating shaft 62a side body of the motor 62, and the weak portion 63c is a narrow portion provided between the case main body portion 63a and the motor mounting portion 63b. The weak portion 63c functions to prevent the case main body portion 63a from breaking, by itself breaking so that the case main body portion 63a separates from the motor 62 and the motor mounting portion 63b, when a large force that tries to push and bend the motor 62 the motor 62 is applied to the case main body portion 63a as will be described later.

Figure 8:
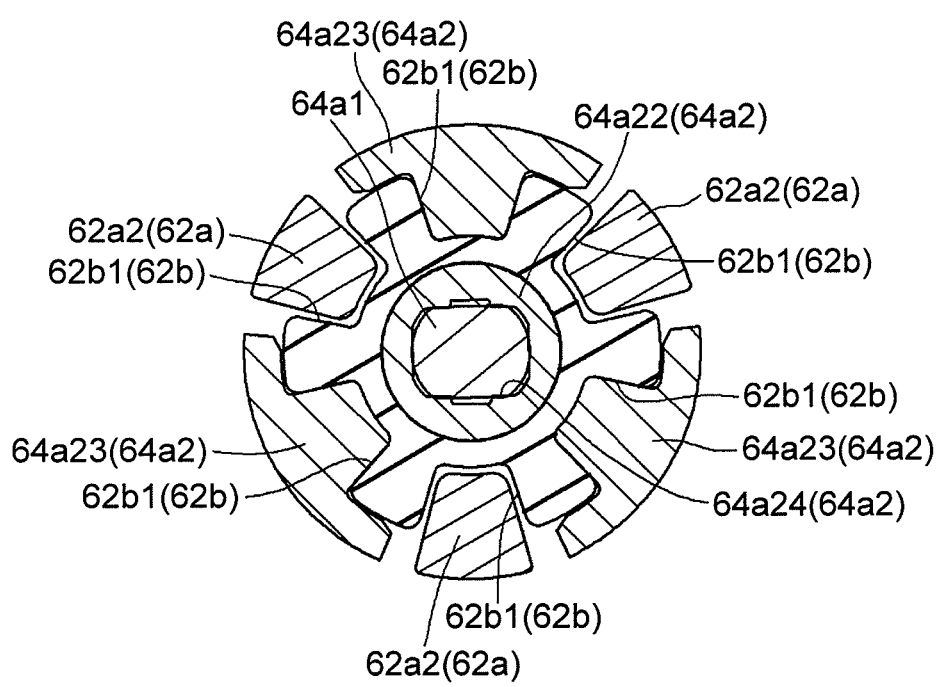
FIG. 8 is a view of a coupling portion at a cross-section taken along line VIII-VIII in FIG. 7.

As shown in FIG. 7, the reduction gear group 64 includes a worm gear 64a to which driving force is transmitted on the same axis as the rotating shaft 62a of the motor 62, the first reduction gear 64b as a worm wheel, an integrated small diameter second reduction gear 64c on the same axis (the rotating shaft 64g) as the first reduction gear 64b, a large diameter third reduction gear 64d that is in mesh with the second reduction gear 64c, and an integrated small diameter pinion gear 64e on the same axis (the rotating shaft 64f) as the third reduction gear 64d. The worm gear 64a is attached to the case main body portion 63a by a rotating shaft 64a1 being rotatably supported by a motor-side bearing 63a7 and a main body-side bearing 63a8. As shown in FIGS. 7 and 8, the rotating shaft 62a of the motor 62 is connected to a metal connecting member 64a2 that is fixed to the rotating shaft 64a1 of the worm gear 64a via a rubber spacer 62b. A terminal end of the rotating shaft 62a of the motor 62 has a shape in which columnar bodies 62a2 having generally trapezoidal cross-sections are arranged with upper base portions facing the center, at 120 degree intervals near an outer peripheral portion of a circular surface of a metal disk 62a1. The connecting member 64a2 has a shape in which a circular cylindrical portion 64a22 with an angular hole 64a24 open in the center is arranged at a circular surface center portion of the disk portion 64a21, and columnar bodies 64a23 having generally hat-shaped cross-sections are arranged with apex portions facing toward the center, at 120 degree intervals near an outer peripheral portion of the circular surface of the disk portion 64a21. A portion with a generally rectangular cross-section that is provided on the rotating shaft 64a1 of the worm gear 64a is inserted into the angular hole 64a24 in the circular cylindrical portion 64a22 and fixed thereto. The spacer 62b has a shape in which six columnar notches 62b1 having generally trapezoidal cross-sections are provided at 60 degree intervals, in the height direction from a torus outer peripheral portion of an annular columnar body. The rotating shaft 62a of the motor 62 and the connecting member 64a2 are connected together by offsetting the upper base portion side portions of the columnar bodies 62a2 of the rotating shaft 62a of the motor 62 and the apex portion side portions of the columnar bodies 64a23 of the connecting member 64a2, and fitting them together in the notches 62b1 of the spacer 62b. That is, the rotating shaft 62a of the motor 62 and the connecting member 64a2 are connected together by a rubber shaft coupling, which is one type of flexible shaft coupling. As a result, the driving force of the motor 62 is transmitted to the worm gear 64a. This portion connected via the spacer 62b is arranged near the weak portion 63c of the gear box case 63. Therefore, if the weak portion 63c of the gear box case 63 breaks, the rotating shaft 62a of the motor 62 will separate from the rotating shaft 64a1 of the worm gear 64a, such that the case main body portion 63a separates from the motor 62 and the motor mounting portion 63b while the worm gear 64a remains in the case main body portion 63a. Here, the rotating shaft 64f is one example of an "output shaft" within the scope of the claims.

As shown in FIG. 7, in the meshing of the worm gear 64a and the first reduction gear 64b, a torsion angle of the worm gear 64a is set smaller than a friction angle. Therefore, the worm gear 64a is set so as not to rotate, even if driving force from the pinion gear 64e side is applied, when the motor 62 has separated while the worm gear 64a remains in the gear box case 63. As a result, even if a downward load is applied to the cushion frame 20 by a rear collision of the vehicle or the like, such that a force that tries to push the rear link 23a down (i.e., a force that tries to rotate the rear link 23a clockwise in FIG. 2) is applied, the reduction gear group 64 will not rotate. Also, with the worm gear 64a, the direction of the torsion angle is set such that, when a force that tries to push the rear link 23a down is transmitted via the reduction gear group 64, the direction of a thrust load applied to the rotating shaft 64a1 will be in a direction toward the main body-side bearing 63a8. Here, the thrust load is a force applied in the axial direction to the rotating shaft 64a1 of the worm gear 64a when the worm gear 64a rotates. Therefore, even if an excessive load that tries to push the rear link 23a down is transmitted via the reduction gear group 64 and by some chance the worm gear 64a does rotate, the worm gear 64*a* is able to be inhibited from separating from the case main body portion 63*a*.

The metal cover plate 65 that covers the recessed portion 63*a*4 of the case main body portion 63*a* is attached to a seat left-side side surface (inside side surface) of the gear box case 63, while the reduction gear group 64 is housed inside the gear box case 63. The cover plate 65 has a generally rectangular shape, as shown in FIGS. 6 and 9. A first support hole 65*a* that supports the rotating shaft 64*g* of the first reduction gear 64*b* and the second reduction gear 64*c*, and a second support hole 65*b* that supports the rotating shaft 64*f* of the third reduction gear 64*d* and the pinion gear 64*e*, are provided in the center portion of the cover plate 65. Four screw holes 65*c*, 65*d*, 65*e*, and 65*f* are provided in locations near an outer peripheral portion of the cover plate 65. Of these, screw hole 65*c* and screw hole 65*d* are arranged so as to be positioned near the weak portion 63*c* of the case main body portion 63*a* when the cover plate 65 is attached to the case main body portion 63*a*. That is, the screw hole 65*c* is provided in a position near a front end portion of an upper end portion of the cover plate 65, and the screw hole 65*d* is provided in a position near a front end portion of a lower end portion of the cover plate 65. With the other two, the screw hole 65*e* is arranged near the center portion in the front-rear direction of the upper end portion of the cover plate 65, and the screw hole 65*f* is arranged near a rear end portion of the lower end portion of the cover plate 65. The rotating shaft 64*g* is supported by the first support hole 63*a*5 in the case main body portion 63*a* and the first support hole 65*a* in the cover plate 65, and the rotating shaft 64*f* is supported by the second support hole 63*a*6 in the case main body portion 63*a* and the second support hole 65*b* in the cover plate 65, when the cover plate 65 is attached by four screws 82 to the case main body portion 63*a* that houses the reduction gear group 64. The rotating shaft 64*f* protrudes toward the seat inside from the left-side side surface (i.e., the seat inside side surface) of the cover plate 65 of the gear box case 63, and the pinion gear 64*e* that meshes with the sector gear 23*b* is attached to this rotating shaft 64*f*. Here, the cover plate 65 is one example of a "reinforcing plate" within the scope of the claims.

Next, the mounting structure by which the motor-equipped gear box 60 is mounted to the right-side side frame 21R will be described. As shown in FIGS. 2 and 9, a rear bolt hole 21R3, a front upper bolt hole 21R4, and a front lower bolt hole 21R5 are provided in positions corresponding to the positions of the rear mounting bolt 63*a*1, the front upper mounting bolt 63*a*2, and the front lower mounting bolt 63*a*3, provided on the gear box case 63 at the rear of the right-side side frame 21R. A first reduction gear shaft avoidance hole 21R6 is provided in a position corresponding to the rotating shaft 64*g* of the first reduction gear 64*b* and the second reduction gear 64*c*, in front of a line that connects the positions of the front upper mounting bolt 63*a*2 and the front lower mounting bolt 63*a*3 together. An output shaft hole 21R8 through which the rotating shaft 64*f* passes is provided to the rear of the line that connects the front upper mounting bolt 63*a*2 and the front lower mounting bolt 63*a*3 together. The rotating shaft 64*f* of the motor-equipped gear box 60 passes through this output shaft hole 21R8 and protrudes toward the seat inside (i.e., the left side) of the right-side side frame 21R, and the pinion gear 64*e* that is attached to this rotating shaft 64*f* meshes with the sector gear 23*b*.

As shown in FIG. 2, a reinforcing member 66 is a metal plate-shaped member that is formed in a general Y-shape. Holes corresponding to the positions of the rear mounting bolt 63*a*1, the front upper mounting bolt 63*a*2, and the front lower mounting bolt 63*a*3 are provided in the gear box case 63 near each apex of the Y-shape. That is, a bolt hole 66*a* is provided corresponding to the rear mounting bolt 63*a*1, a bolt hole 66*b* is provided corresponding to the front upper mounting bolt 63*a*2, and a bolt hole 66*c* is provided corresponding to the front lower mounting bolt 63*a*3. Also, an output shaft hole 66*d* that supports the rotating shaft 64*f* is provided in the center portion of the Y-shape. This reinforcing member 66 is fixed in place, with the right-side side frame 21R and the spacer 80 sandwiched between the reinforcing member 66 and the gear box case 63, by fastening nuts 81 to the three bolts described above. The spacer 80 is arranged in a non-contact state inside a hole 23*b*3 for the sector gear 23*b*, and the sector gear 23*b* is rotatably arranged in a space ensured by the spacer 80, between the right-side side frame 21R and the reinforcing member 66. As a result, the space between the bolts and the rotating shaft 64*f* is reinforced so that a distance of the space will be remained, and the meshing of the sector gear 23*b* and the pinion gear 64*e* mounted on the rotating shaft 64*f* is reinforced so that the two will not come out of mesh.

The example embodiment structured as described above displays the operation and effects described below. When a large load is applied as a result of a rear collision of a vehicle or the like to a vehicle seat provided with the motor-equipped gear box 60 according to this example embodiment, a force that tries to push the rear link 23*a* down (i.e., a force that tries to rotate the rear link 23*a* clockwise in FIG. 2) is applied. This rotational force is transmitted to the reduction gear group 64 via the sector gear 23*b*, but is not transmitted to the rotating shaft 62*a* of the motor 62 because the worm gear 64*a* does not rotate. Here, the right-side side frame 21R may deform due to the large load applied to the vehicle seat, such that a large force that tries to push and bend the motor 62 may be applied to the gear box 61. Here, the weak portion 63*c* is provided on the gear box 61, and the rotating shaft 62*a* of the motor 62 is detachably connected to the rotating shaft 64*a*1 of the worm gear 64*a* via the spacer 62*b*. Therefore, the gear box 61 breaks at the weak portion 63*c*, and the motor 62 and the motor mounting portion 63*b* separate from the case main body portion 63*a*. The reduction gear group 64 housed in the case main body portion 63*a* is held so as not to rotate by force from the rear link 23*a*, so the rear link 23*a* does not rotate with respect to the right-side side frame 21R, and the distance between the cushion frame 20 and the slide rail 50 is maintained. That is, the reduction gear group 64 is inhibited from scattering.

Also, the cover plate 65 is attached to the gear box 61, and the screw hole 65*c* and the screw hole 65*d* for this attachment are arranged in positions near the weak portion 63*c* of the case main body portion 63*a*. As a result, the case main body portion 63*a* that keeps the reduction gear group 64 in a meshed state is able to be kept from breaking easily, and the stress is able to be more efficiently concentrated at the weak portion 63*c* so the weak portion 63*c* is able to break easily. Further, with the worm gear 64*a*, the direction of the torsion angle is set such that, when a force that tries to push the rear link 23*a* down is transmitted via the reduction gear group 64, the direction of a thrust load applied to the rotating shaft 64*a*1 will be in a direction toward the main body-side bearing 63*a*8. Therefore, even if an excessively large force that tries to push the rear link 23*a* down is transmitted via the reduction gear group 64, and by some chance the worm gear 64*a* rotates, the worm gear 64*a* is able to be inhibited from separating from the case main body portion 63*a*.

While a specific embodiment has been described, the invention is not limited to the appearances and structure of this embodiment. Various modifications, additions, and omissions are also possible within the scope of the invention.

In the example embodiment described above, the weak portion 63c is a narrow portion provided between the case main body portion 63a and the motor mounting portion 63b, but the weak portion 63c is not limited to this. That is, the weak portion 63c may also be a thin portion or may be made of different material that has low strength.

In the example embodiment described above, the rotating shaft 62a of the motor 62 and the rotating shaft 64a1 of the worm gear 64a are detachably connected together via the spacer 62b, but they are not limited to this. That is, a weakened portion may be provided between the rotating shaft 62a of the motor 62 and the rotating shaft 64a1 of the worm gear 64a such that breakage occurs at this weakened portion.

In the example embodiment described above, the invention is applied to the seat of an automobile (a vehicle), but the invention may also be applied to a seat mounted in an aircraft, a vessel, or a train or the like.

What is claimed is:

1. A motor-equipped gear box mounting structure that is configured to be attached to a frame member that extends in a front-rear direction of a vehicle power seat and to vertically adjust a seating surface of the vehicle power seat, the motor-equipped gear box mounting structure comprising:
   a motor-equipped gear box that includes a motor and a gear box, wherein
   the gear box comprises:
      a main body portion that is configured to be fixed to the frame member and within which is housed a reduction gear group that transmits a driving force from the motor to an output shaft, the main body portion including a motor-side bearing holding portion that holds a motor-side rotary bearing;
      a motor mounting portion that mounts the motor to the main body portion;
      a weak portion defining a plane and disposed between the main body portion and the motor mounting portion such that the weak portion is provided on a motor-side of the motor-side bearing holding portion,
   the weak portion being configured to break such that the motor and the motor mounting portion detach from the main body portion as a result of a pressing force being applied to the motor-equipped gear box due to deformation of the frame member when the motor-equipped gear box mounting structure is attached to the frame member, and
   a rotating shaft of the motor is coaxially and detachably coupled to a rotating shaft of a worm gear by a connection, wherein the worm gear is one gear in the reduction gear group,
   wherein at least a portion of the connection is disposed in the plane defined by the weak portion.

2. The motor-equipped gear box mounting structure according to claim 1, wherein
   the main body portion, the motor mounting portion, and the weak portion are an integrated resin part, and the weak portion is narrower than the main body portion and the motor mounting portion.

3. The motor-equipped gear box mounting structure according to claim 1, wherein
   the rotating shaft of the motor is connected to the rotating shaft of the worm gear by a rubber shaft coupling that detachably connects the rotating shaft of the motor to the rotating shaft of the worm gear via a rubber spacer.

4. The motor-equipped gear box mounting structure according to claim 1, wherein
   a reinforcing plate is attached to a surface of the main body portion that is on a side where the main body portion is configured to attach to the frame member, the reinforcing plate reinforces the main body portion and supports a rotating shaft of an other gear in the reduction gear group that transmits driving force from the worm gear to the output shaft, and
   at least one fixing position, where the reinforcing plate is fixed to the main body portion, is provided adjacent to the weak portion.

5. The motor-equipped gear box mounting structure according to claim 1, wherein
   the worm gear comprises a torsion angle direction configured such that an axial thrust force applied to the rotating shaft of the worm gear acts in a direction away from the motor when a rotational force applied to the output shaft is transmitted to the worm gear when a vehicle collision occurs.

6. The motor-equipped gear box mounting structure according to claim 1, wherein
   the main body portion and the motor mounting portion taper to the weak portion.

7. The motor-equipped gear box mounting structure according to claim 1, wherein
   the main body portion, the motor mounting portion, and the weak portion define a unitary portion of the gear box.

8. The motor-equipped gear box mounting structure according to claim 1, wherein
   the weak portion is thinner in cross section than both the main body potion and the motor mounting portion.

9. The motor-equipped gear box mounting structure according to claim 1, wherein
   a perimeter of an outer portion of the weak portion is less than both a perimeter of an outer portion of the main body portion and a perimeter of an outer portion of the motor mounting portion.

10. The motor-equipped gear box mounting structure according to claim 1, wherein:
    the rotating shaft of the motor has a terminal end having a plurality of columnar bodies, and
    the connection comprises:
       a connecting member fixed to the rotating shaft of the worm gear having a plurality of connecting member columnar bodies; and
       a spacer arranged between the rotating shaft of the motor and the connecting member, the spacer having a plurality of notches that accommodate the columnar bodies and the connecting member columnar bodies.

* * * * *